United States Patent
Talaski

(10) Patent No.: US 9,027,594 B2
(45) Date of Patent: May 12, 2015

(54) FUEL SYSTEM VALVE ASSEMBLY

(75) Inventor: Edward J. Talaski, Caro, MI (US)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 0 days.

(21) Appl. No.: 13/435,677

(22) Filed: Mar. 30, 2012

(65) Prior Publication Data

US 2013/0256577 A1 Oct. 3, 2013

(51) Int. Cl.
F16K 15/02 (2006.01)
F16K 15/06 (2006.01)
F02M 37/02 (2006.01)

(52) U.S. Cl.
CPC .................................... *F16K 15/063* (2013.01)

(58) Field of Classification Search
CPC . F16K 15/026; F16K 15/063; F16K 27/0209; F02M 37/0023
USPC .............. 137/565.15, 542, 543; 251/333, 118
See application file for complete search history.

(56) References Cited

U.S. PATENT DOCUMENTS

| 4,181,144 | A | | 1/1980 | Landen |
| 5,245,976 | A | * | 9/1993 | Faull ............................. 123/587 |
| 5,251,664 | A | * | 10/1993 | Arvidsson et al. ............ 137/514 |
| 5,313,978 | A | | 5/1994 | Takaki et al. |
| 5,421,306 | A | | 6/1995 | Talaski |
| 5,623,910 | A | | 4/1997 | Riggle |
| 6,019,570 | A | * | 2/2000 | Talaski ......................... 415/55.1 |
| 7,210,460 | B2 | | 5/2007 | Douyama et |
| 2004/0112429 | A1 | | 6/2004 | Mack |
| 2007/0138423 | A1 | | 6/2007 | Smith |

FOREIGN PATENT DOCUMENTS

| DE | 102006019670 | 11/2006 |
| GB | 813183 | 5/1995 |
| GB | 2443427 | 5/2008 |
| WO | 2005078273 | 8/2005 |

OTHER PUBLICATIONS

Jul. 12, 2013 Search Report in EP 13159539.9.

* cited by examiner

*Primary Examiner* — Atif Chaudry
(74) *Attorney, Agent, or Firm* — Reising Ethington P.C.

(57) ABSTRACT

A fuel system valve assembly may include a housing, a spring, and a body. The housing may have a fuel passage defined in part or more by a fuel passage wall. The fuel passage wall may have a seat and a cylindrical section. The cylindrical section may have a constant diameter and may be located downstream of the seat. In use, the body may reciprocate linearly in the housing between an open position and a closed position. The body may be biased to the closed position by the spring. The body may abut the seat when the body is in the closed position.

21 Claims, 2 Drawing Sheets

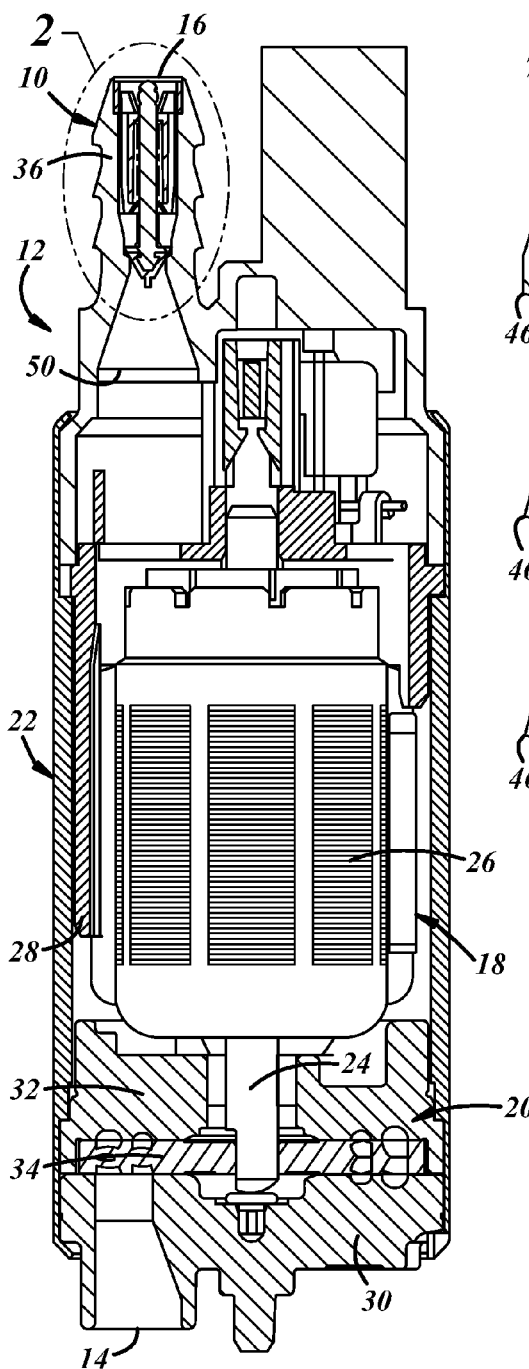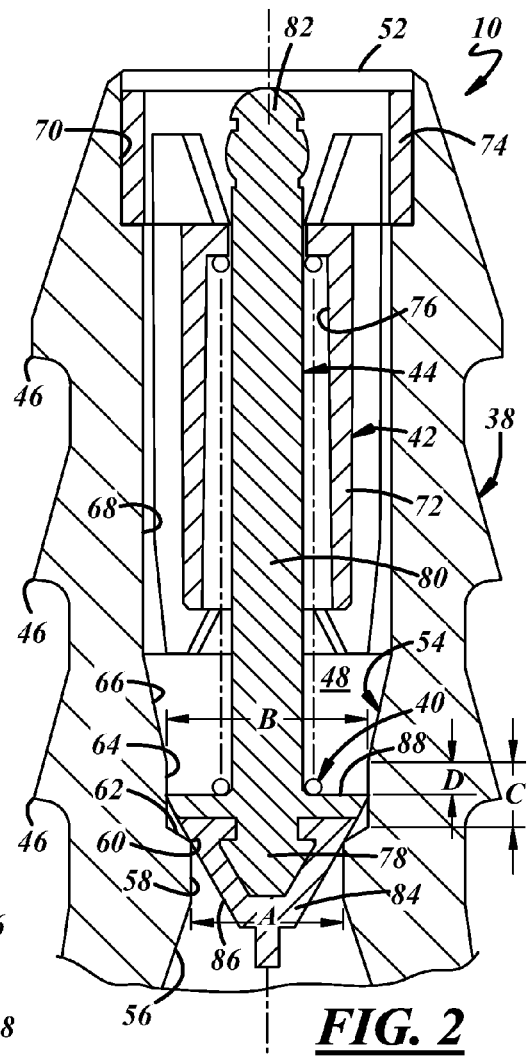
*FIG. 1*
*FIG. 2*

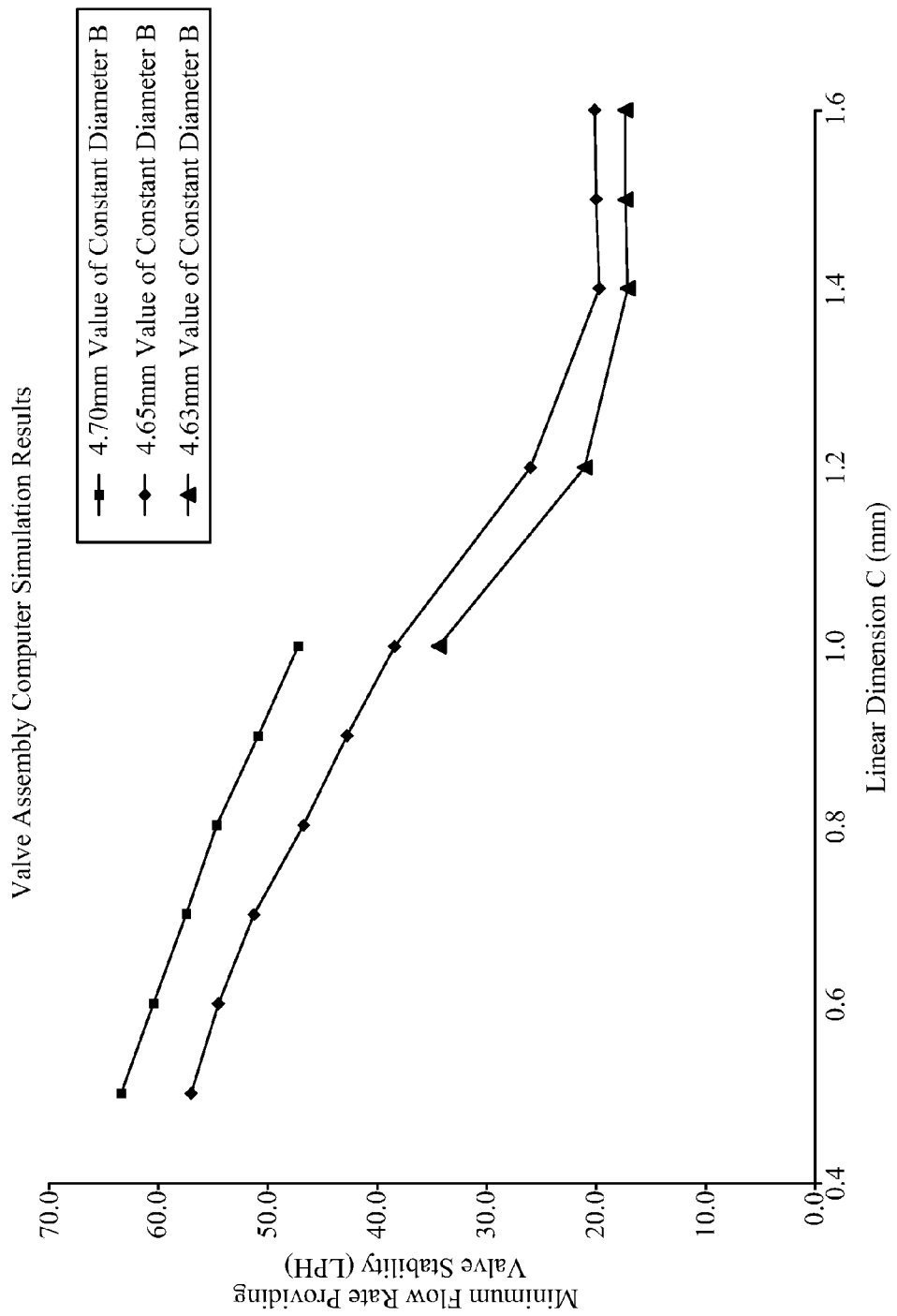

FUEL SYSTEM VALVE ASSEMBLY

TECHNICAL FIELD

The present disclosure relates generally to vehicle fuel systems, and more particularly to valve assemblies used in vehicle fuel systems.

BACKGROUND

Vehicle fuel systems provide liquid fuel to a prime mover such as an automotive internal combustion engine, and often include a fuel tank, a fuel pump, and fuel injectors. The fuel pump draws liquid fuel out of the fuel tank, pressurizes the liquid fuel, and sends the liquid fuel to the fuel injectors via fuel lines. Valve assemblies are commonly equipped in vehicle fuel systems in order to regulate liquid fuel-flow in the systems and between the fuel tanks, fuel pumps, and fuel injectors. Among other possible functions, the valve assemblies can serve as check valves, bypass pressure valves, pressure relief valves, or a combination thereof.

SUMMARY

A fuel system valve assembly may include a housing, a spring, and a body. The housing may have a fuel passage defined by a part or more of a fuel passage wall. The fuel passage wall may have a seat and may have a cylindrical section of constant diameter located downstream of the seat. The body may reciprocate linearly in the housing between an open position and a closed position, and the body may be biased to the closed position by the spring. The body may abut the seat when the body is in the closed position. The cylindrical section may have its constant diameter for a linear dimension that is greater than 1.0 mm.

A fuel system valve assembly may include a housing, a spring, and a body. The housing may have a fuel passage defined by a part or more of a fuel passage wall. The fuel passage wall may have a seat and may have a cylindrical section of constant diameter located downstream of the seat. The body may be received in the housing for linear reciprocation between an open position and a closed position, and the body may be biased to the closed position by the spring. The body may abut the seat when the body is in the closed position. The cylindrical section may have its constant diameter for a linear dimension. A ratio of the linear dimension of the constant diameter to the value of the constant diameter of the cylindrical section may range between approximately 0.23 to 0.35, including the values 0.23 and 0.35.

A fuel system valve assembly may include a housing, a spring, a sleeve, and a body. The housing may have a fuel passage defined by a part or more of a fuel passage wall. The fuel passage wall may have a seat and may have a cylindrical section of constant diameter located downstream of the seat. The fuel passage wall may also have a frustoconical section located downstream of the cylindrical section. The sleeve may be located partly or more within the housing, and the sleeve may partly or more surround the spring. The body may reciprocate linearly in the housing between an open position and a closed position, and the body may be biased to the closed position by the spring. The body may be partly or more surrounded by the sleeve. The body may have a head with a rubber cap that may directly abut the seat when the body is in the closed position. The constant diameter may have a value ranging between approximately 4.63 mm to 4.70 mm, including the values 4.63 and 4.70. And the cylindrical section may have its constant diameter for a linear dimension ranging between approximately 1.1 mm and 1.6 mm, including the values 1.1 and 1.6.

BRIEF DESCRIPTION OF THE DRAWINGS

The following detailed description of exemplary embodiments and best mode will be set forth with reference to the accompanying drawings, in which:

FIG. 1 is a cross-sectional view of one embodiment of a fuel pump;

FIG. 2 is a cross-sectional view of one embodiment of a fuel system valve assembly that can be used with the fuel pump of FIG. 1; and FIG. 3 is a graph showing minimum volumetric fluid-flow rate providing valve stability versus a linear dimension of a constant diameter of a cylindrical section.

DETAILED DESCRIPTION OF PRESENTLY PREFERRED EMBODIMENTS

Referring in more detail to the drawings, a fuel system valve assembly 10 can be used in a vehicle fuel system, such as an automotive fuel system with a gasoline or diesel engine, in order to regulate liquid fuel-flow in the fuel system among different components like a fuel tank, a fuel pump 12, and fuel injectors. Depending on the application and intended functionality, in one embodiment the valve assembly 10 can be installed in a fuel system line, in another embodiment the valve assembly can be part of a fuel supply module, and in yet another embodiment, such as that of FIG. 1, the valve assembly can be part of a fuel pump. In any of these applications and in others, the valve assembly 10 can be designed and constructed to serve as a check valve, a bypass pressure valve, a pressure relief valve, or a combination thereof. Compared to some known valves, in use, the valve assembly 10 has an improved stability at lower volumetric flow rates, generates less noise and vibration at these lower flow rates, and exhibits a reduced pressure drop upon initial opening.

Referring to FIG. 1, the fuel pump 12 supplies pressurized liquid fuel to the engine of the fuel system by drawing liquid fuel from the fuel tank through an inlet 14, pressurizing the liquid fuel, and discharging the liquid fuel through an outlet 16 and eventually to the engine. The fuel pump 12 can have different designs and constructions depending upon, among other considerations, its application in the particular fuel system. For example, the fuel pump 12 can be mounted outside of the fuel tank, can be mounted directly inside of the fuel tank, or can be part of a fuel supply module that itself is mounted or suspended directly inside of the fuel tank. In the example of the fuel supply module, the fuel pump 12 would be carried in a housing and would have a fuel filter connected to the inlet 14. In the embodiment of FIG. 1, the fuel pump 12 includes a drive assembly 18 and a pump assembly 20, both of which are supported in a housing 22. The drive assembly 18 is coupled to and rotates the pump assembly 20 via a shaft 24. In general, the drive assembly 18 includes an electric motor with an armature assembly 26 and a surrounding permanent magnet 28. The pump assembly 20 draws in liquid fuel, pressurizes the liquid fuel, and discharges the liquid fuel through the outlet 16. In general, the pump assembly 20 includes a lower plate 30, an upper plate 32, and a vaned impeller 34 located between the lower and upper plates.

The fuel system valve assembly 10 can have different designs and constructions depending upon, among other considerations, its application and the expected volumetric flow rates that the valve assembly will regulate. In the embodiment of FIG. 1, the valve assembly 10 is installed near the outlet 14 and within an outlet nipple 36 of the fuel pump 12 and, in this sense, is carried by or a part of the fuel pump. Referring in particular to FIG. 2, the valve assembly 10 can include a housing 38 (here, a structure of the fuel pump 12 constituting the outlet nipple 36), a biasing member such as a spring 40, a sleeve 42, and a body 44. In different applications, the housing 38 can connect to a fuel system line or, in other embodiments not shown in the figures, can be coupled to a wall or other structure of a fuel supply module. In assembly in this embodiment, the housing 38 supports and surrounds the other components of the valve assembly 10. In one example, the housing 38 can be composed of a plastic material and can be manufactured by an injection molding process. Further, at its exterior and in order to facilitate connection and coupling to a fuel system line, the housing 38 has several radially-extending barbs 46.

At its interior, the housing 38 has a fuel passage 48 extending between an inlet opening 50 and an outlet opening 52, and defined by a fuel passage wall 54. The fuel passage 48 and fuel passage wall 54 have different sections along their axial extents in order to accommodate the components and functionality of the valve assembly 10. In the embodiment of FIG. 2, a first frustoconical section 56 has a tapering and reducing diameter in the downstream direction of fuel-flow. Downstream of the first frustoconical section 56, the fuel passage wall 54 has a first cylindrical section 58 of constant diameter A. In one specific example, the constant diameter A has a value of approximately 3.25 mm; of course, other values are possible. Further, a seat 60 is located at a terminal edge of the first cylindrical section 58. As shown in FIG. 2, when the valve assembly 10 is in a closed position, the seat 60 is engaged by the body 44 and forms a seal therewith. Immediately downstream of the seat 60, a second frustoconical section 62 has an increasing diameter in the downstream direction, and immediately downstream of the second frustoconical section is a second cylindrical section 64 of constant diameter B. A third frustoconical section 66 of increasing diameter is located immediately downstream of the second cylindrical section 64, a third cylindrical section 68 which may have a constant diameter is located downstream of the third frustoconical section, and a fourth cylindrical section 70 which may have a constant diameter is located downstream of the third cylindrical section. Of course, in other embodiments, for example, the fuel passage and fuel passage wall could have different sections or could have similar sections in a different order.

Still referring to FIG. 2, the spring 40 is located inside of the housing 38 and is retained in place by, and partly surrounded by, the sleeve 42. In assembly, the spring 40 surrounds the body 44 and biases the body to the closed position against the direction of fuel-flow. In one specific example, the spring 40 is a coil spring made of a stainless steel type 302 per ASTM A-313 material and has a spring rate of 77.949 N/m. Of course, in other embodiments other types of springs could be used, and springs of different materials and different spring rates are possible.

The sleeve 42 is also located inside of the housing 38, retains the spring 40 and the body 44 in place, and provides some guidance for the spring and body in assembly and during use. In the embodiment of FIG. 2, the sleeve 42 can be press-fit into the fuel passage 48, can be secured in the housing by rolling end portions of the housing at the outlet opening 52 radially inwardly to trap the sleeve within the fuel passage 48, a combination of both, or by other ways. The sleeve 42 has a guide portion 72 located in the third cylindrical section 68 and has a comparatively diametrically enlarged portion 74 located in the fourth cylindrical section 70. To receive the spring 40 and the body 44, the sleeve 42 has a bore 76 extending generally along its central axis. In one example, the sleeve 42 can be composed of a plastic material and can be manufactured by an injection molding process.

The body 44 reciprocates linearly and axially back-and-forth between an open position to permit fuel-flow and a closed position to prevent fuel-flow. In one example, the body 44 is made of a stainless steel type 303 or type 302; of course, other materials are possible. Still referring to FIG. 2, the body 44 has a head 78, a stem 80, and a tail end 82. When the valve assembly 10 is in the closed position as shown in FIG. 2, the head 78 abuts and engages the seat 60 to form a seal therewith. The head 78 generally resembles a cone with a tapering and reducing diameter toward its apex. In this embodiment, a cap 84 made of a rubber material is encased over the head 78 and has an outer face 86 that directly abuts the seat 60 of the fuel passage wall 54 when the valve assembly 10 is in the closed position. Opposite the outer face 86, the head 78 has a back face 88. In one embodiment, the back face 88 has a diameter that has a value that can be approximately 1% to 5% less than a value of the constant diameter B of the second cylindrical section 64. And in one specific example, the diameter of the back face 88 has a value of approximately 4.5 mm. Of course, other values are possible for the diameter of the back face 88, including values that are not 1% to 5% less than the value of the constant diameter B.

As mentioned, in operation, the fuel system valve assembly 10 has improved stability at lower volumetric flow rates and accordingly generates less noise and vibration at these lower flow rates, and the valve assembly exhibits a reduced pressure drop upon initial opening movement. Because some newer fuel systems utilize a lower fuel volumetric flow rate than older fuel systems, the valve assemblies in these newer fuel systems are subjected to lower volumetric flow rates. For example, valve assemblies can be subjected to volumetric flow rates that are less than 60 liters per hour (LPH) and even less than 40 LPH. It has been found that some valve assemblies at the lower flow rates can become unstable and can consequently generate noise and vibrations such as a so-called buzzing noise. It is currently believed that the buzzing noise is caused by a localized decreasing pressure at areas between the outer face 86 of the valve head 78 and the seat 60 and at areas between the outer face and the transition between the second cylindrical section 64 and the third frustoconical section 66, and an accompanying back-and-forth fluttering movement in the linear direction of the valve assembly 10.

Referring again to FIG. 2, the inventors here have discovered that one dimension that can affect stability and noise and vibration generation is a linear or axial dimension C of the second cylindrical section 64. The linear dimension C is the axial extent and distance that the constant diameter B is maintained in the fuel passage 48 and the fuel passage wall 54. Without wishing to be limited to a particular theory of causation, it is currently believed that the improved stability and reduced pressure drop could be the result of—among other possibilities—a more restricted and limited fuel-flow volume between the outer face 86 and the fuel passage wall 54 upon initial opening movement of the valve or when the outer face and fuel passage wall otherwise come into close proximity with each other such as near the seat 60. Put another way, with an increased linear dimension C the head 78 of the valve body 44 has to move in an increased backward axial distance as it is opening before the back face 88 reaches and passes the transition between the second cylindrical section 64 and the third frustoconical section 66. Once passed the transition, the fuel-flow volume increases per given amount of valve head 78 movement, due to the increasing diameter of the third frustoconical section 66. Hence, a greater force can be exerted on the head 78 by liquid fuel-flow acting on the outer face 86 during that backward movement, and likewise greater pressure can be exerted on the head by upstream liquid fuel-flow acting against the outer face. The greater force and greater pressure can drive the body 44 away from the seat 60 and in the opening direction more rapidly.

Somewhat related to the linear dimension C is a linear dimension D. The linear dimension D is the axial extent and distance that the constant diameter B is maintained between the back face 88 and the transition between the second cylindrical section 64 and the third frustoconical section 66 when the valve assembly 10 is in the closed position. In one specific example, the linear dimension D has a value of approximately 0.6 mm to 0.7 mm; of course, other values are possible.

Still referring to FIG. 2, the inventors here have discovered that another dimension that can affect stability and noise and vibration generation is the value of the constant diameter B of the second cylindrical section 64. Similarly as described above, in some cases a reduced value of the constant diameter B can provide a more restricted and limited fuel-flow volume between the outer face 86 and the fuel passage wall 54, and can therefore result in a greater force and greater pressure exerted on the head 78.

Referring now to FIG. 3 which is a computer simulated graph of minimum volumetric flow rate providing valve stability versus values of the linear dimension C. The computer simulation that resulted in this graph was performed with a fuel system valve assembly having a similar design and construction as that described and shown in the embodiment of FIG. 2. In the simulation, three different values of the constant diameter B of the second cylindrical section 64 were modeled—4.63 mm, 4.65 mm, and 4.70 mm. And values for the linear dimension C of the constant diameter B ranged between approximately 0.5 mm to 1.6 mm. Valve stability as used in the graph generally means that the fuel system valve assembly does not generate substantially observable noise and vibration such as the buzzing noise. Accordingly, the valve assembly could be considered unstable from a noise and vibration perspective when subjected to volumetric flow rates below the lines shown in the graph. Looking at the results, values of the linear dimension C greater than approximately 1.0 mm for constant diameter B values of 4.65 mm and 4.63 mm provide valve stability of volumetric flow rates ranging between approximately 40 LPH to as low as approximately 18 LPH. And values of the linear dimension C between approximately 1.4 mm and 1.6 mm for constant diameter B values of 4.65 mm and 4.63 mm provide valve stability at volumetric flow rates at respectively approximately 20 LPH and 18 LPH. According to the graph, it is considered that values of the linear dimension C greater than approximately 1.0 mm and less than or equal to approximately 1.6 mm can be suitable for relatively low flow rate automotive engine and fuel system applications; and, more specifically, values ranging between approximately 1.2 mm and 1.6 mm; and, even more specifically, a value of approximately 1.5 mm. Skilled artisans will appreciate that not all experimental simulation will yield the exact results depicted in the graph of FIG. 3.

Furthermore, one dimensional relationship that can affect valve stability and noise and vibration generation is a ratio of the linear dimension C of the constant diameter B to the value of the constant diameter B of the second cylindrical section 64. It has been found that keeping the ratio within the values of approximately 0.23 to 0.35 can maintain valve stability at volumetric flow rates below 40 LPH, which can be suitable for relatively low flow rate automotive engine and fuel system applications. In one specific example, the fuel system valve assembly 10 has a linear dimension C value of approximately 1.5 mm and has a constant diameter B value of approximately 4.63 mm, giving a ratio of approximately 0.32.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fuel system valve assembly, comprising:
a housing having a fuel passage defined at least in part by a fuel passage wall, said fuel passage wall having a seat, a cylindrical section of constant diameter located downstream of said seat, and a frustoconical section located immediately downstream of said cylindrical section;
a spring; and
a body reciprocating linearly in said housing between an open position and a closed position, said body being biased to the closed position by said spring, said body having a valve head with a substantially frustoconical exterior surface abutting said seat when said body is in the closed position and having a maximum diameter portion of the valve head downstream of said seat when the valve head abuts said seat,
said cylindrical section has its constant diameter for a linear dimension that is greater than 1.0 mm and a ratio of the linear dimension to the constant diameter is approximately 0.23 to 0.35 inclusive;
said maximum diameter portion of said valve head being approximately 1% to 5% less than said constant diameter of said cylindrical section;
when said body is in the closed position, the maximum diameter portion of said valve head is disposed axially wholly within said cylindrical section and said cylindrical section extends downstream of said maximum diameter portion of said valve head; and
the valve assembly is stable at volumetric flow rates of approximately 40 LPH to 20 LPH.

2. The fuel system valve assembly of claim 1, further comprising a sleeve located at least partly within said housing, said sleeve at least partly surrounding said spring and at least partly surrounding said body.

3. The fuel system valve assembly of claim 1, wherein said valve head has a cap made of rubber, said cap being carried by said valve head and said cap directly abutting said seat when said body is in the closed position.

4. The fuel system valve assembly of claim 1, wherein said cylindrical section has its constant diameter for a linear dimension ranging between approximately 1.1 mm to 1.6 mm, inclusive.

5. The fuel system valve assembly of claim 1, wherein said cylindrical section has its constant diameter for a linear dimension of approximately 1.5 mm.

6. The fuel system valve assembly of claim 1, wherein the constant diameter of said cylindrical section has a value ranging between approximately 4.63 mm to 4.70 mm, inclusive.

7. The fuel system valve assembly of claim 1, wherein said valve head has a back face having a diameter that is approximately 1% to 5% less than a value of the constant diameter of said cylindrical section.

8. The fuel system valve assembly of claim 1, wherein a ratio of the linear dimension of the constant diameter of said cylindrical section to the value of the constant diameter of said cylindrical section is approximately 0.32.

9. The fuel system valve assembly of claim 1, wherein said housing is carried by or is a part of a fuel pump.

10. The fuel system valve assembly of claim 1 wherein the valve head has a back face and when the valve head is in the closed position the back face is disposed axially upstream of a downstream end of the cylindrical section at least approximately 0.6 mm.

11. A fuel system valve assembly, comprising:
a housing having a fuel passage defined at least in part by a fuel passage wall, said fuel passage wall having a seat, a cylindrical section of constant diameter located downstream of said seat and a generally frustoconical section immediately downstream of said cylindrical section;
a spring; and
a body received in said housing for linear reciprocation between an open position and a closed position, said body being biased to the closed position by said spring, said body having a valve head with a substantially frustoconical exterior surface abutting said seat when said body is in the closed position and having a maximum diameter of the valve head downstream of said seat and within said cylindrical section, said cylindrical section has its constant diameter for a linear dimension greater than 1.0 mm, and a ratio of the linear dimension of the constant diameter of said cylindrical section to the value of the constant diameter of said cylindrical section ranges between 0.23 to 0.35, inclusive and said maximum diameter of said valve head is less than the constant diameter of said cylindrical section by 1% to 5%; and
the valve assembly is stable at a volumetric flow rate of less than 40 LPH.

12. The fuel system valve assembly of claim 11, wherein the ratio of the linear dimension of the constant diameter to the value of the constant diameter of said cylindrical section is approximately 0.32.

13. The fuel system valve assembly of claim 11, wherein said cylindrical section has its constant diameter for a linear dimension ranging between approximately 1.1 mm to 1.6 mm, inclusive.

14. The fuel system valve assembly of claim 11, wherein said cylindrical section has its constant diameter for a linear dimension of approximately 1.5 mm.

15. The fuel system valve assembly of claim 11, wherein the constant diameter of said cylindrical section has a value ranging between approximately 4.63 mm to 4.70 mm, inclusive.

16. The fuel system valve assembly of claim 11, wherein the constant diameter of said cylindrical section has a value of approximately 4.63 mm.

17. The fuel system valve assembly of claim 11 wherein the valve head has a back face and when the valve head is in the closed position the back face is disposed axially upstream of a downstream end of the cylindrical section at least approximately 0.6 mm.

18. A fuel system valve assembly, comprising:
a housing having a fuel passage defined at least in part by a fuel passage wall, said fuel passage wall having a seat, having a cylindrical section of constant diameter located downstream of said seat, and having frustoconical section located downstream of said cylindrical section;
a spring;
a sleeve located at least partly within said housing, said sleeve at least partly surrounding said spring; and
a body reciprocating linearly in said housing between an open position and a closed position, said body being biased to the closed position by said spring and being at least partly surrounded by said sleeve, said body having a valve head with a rubber cap with a substantially frustoconical exterior surface that directly abuts said seat when said body is in the closed position and having a maximum diameter of the valve head downstream of the seat and within the cylindrical section when in the closed position, wherein the constant diameter of said cylindrical section has a value ranging between approximately 4.63 mm to 4.70 mm, inclusive, and wherein said cylindrical section has its constant diameter for a linear dimension ranging between approximately 1.1 mm to 1.6 mm, inclusive, and said valve head including said rubber cap has a maximum diameter approximately 1% to 5% less than the constant diameter of said cylindrical section; and
the valve assembly is stable at volumetric now rates as low as 40 LPH to 20 LPH.

19. The fuel system valve assembly of claim 18, wherein the constant diameter has a value of approximately 4.63 mm, and wherein said cylindrical section has its constant diameter for a linear dimension of approximately 1.5 mm.

20. The fuel system valve assembly of claim 18, wherein when said body is in the closed position, the maximum diameter of said valve head is axially wholly within said cylindrical section of constant diameter.

21. The fuel system valve assembly of claim 18 wherein the valve head has a back face and when the valve head is in the closed position the back face is disposed axially upstream of a downstream end of the cylindrical section at least approximately 0.6 mm.

* * * * *